United States Patent
Fedorov et al.

(10) Patent No.: US 9,654,634 B2
(45) Date of Patent: May 16, 2017

(54) MANAGEMENT OF TRANSACTION ROUTING TO ENTERPRISE AGENTS

(75) Inventors: Sergey Fedorov, Moraga, CA (US); Nikolay Anisimov, Concord, CA (US); Herbert Ristock, Walnut Creek, CA (US); Vladimir Mezhibovsky, San Francisco, CA (US); Nikolay Korolev, Concord, CA (US); Vadim Dymshyts, Pacifica, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 863 days.

(21) Appl. No.: 12/427,172

(22) Filed: Apr. 21, 2009

(65) Prior Publication Data

US 2010/0266115 A1 Oct. 21, 2010

(51) Int. Cl.
*H04M 3/523* (2006.01)
*H04M 3/51* (2006.01)

(52) U.S. Cl.
CPC ....... *H04M 3/5191* (2013.01); *H04M 3/5238* (2013.01)

(58) Field of Classification Search
CPC .. H04M 3/523; H04M 3/5232; H04M 3/5238; H04M 3/5237; H04M 3/5183; H04M 3/5166; H04M 2203/402
USPC ............ 379/265.11, 265.12, 266.01, 265.01, 379/265.02, 265.1
See application file for complete search history.

(56) References Cited

U.S. PATENT DOCUMENTS

| | | | |
|---|---|---|---|
| 5,168,515 A * | 12/1992 | Gechter et al. | 379/265.04 |
| 5,185,780 A | 2/1993 | Leggett | |
| 5,206,903 A | 4/1993 | Kohler et al. | |
| 5,214,688 A * | 5/1993 | Szlam et al. | 379/266.08 |
| 5,335,269 A * | 8/1994 | Steinlicht | 379/266.05 |
| 5,396,542 A * | 3/1995 | Alger et al. | 379/67.1 |
| 5,506,898 A | 4/1996 | Costantini et al. | |
| 5,815,566 A | 9/1998 | Ramot et al. | |
| 5,926,528 A | 7/1999 | David | |
| 5,970,135 A * | 10/1999 | Lenihan et al. | 379/266.02 |
| 6,282,282 B1 * | 8/2001 | Wineberg et al. | 379/265.02 |
| 6,493,446 B1 | 12/2002 | Cherry | |
| 6,687,241 B1 * | 2/2004 | Goss | 370/352 |
| 6,714,643 B1 * | 3/2004 | Gargeya et al. | 379/266.06 |
| 6,771,765 B1 | 8/2004 | Crowther et al. | |
| 7,043,007 B2 * | 5/2006 | McPartlan et al. | 379/265.02 |
| 7,110,523 B2 * | 9/2006 | Gagle et al. | 379/265.01 |
| 2003/0058838 A1 * | 3/2003 | Wengrovitz | 370/352 |
| 2005/0080637 A1 | 4/2005 | Gruia et al. | |
| 2006/0159027 A1 * | 7/2006 | Owens | 370/252 |
| 2007/0019618 A1 * | 1/2007 | Shaffer et al. | 370/352 |
| 2007/0143417 A1 * | 6/2007 | Daigle | 709/206 |
| 2008/0225872 A1 | 9/2008 | Collins et al. | |
| 2009/0125432 A1 * | 5/2009 | Deshpande et al. | 705/37 |

(Continued)

*Primary Examiner* — Ahmad F Matar
*Assistant Examiner* — Jirapon Intavong
(74) *Attorney, Agent, or Firm* — Lewis Roca Rothgerber Christie LLP

(57) ABSTRACT

A system is provided for routing transactions to individual ones of a group of agents, comprising, a queue wherein transactions to be routed are placed, a transmission facility sending invitations to interact with a transaction from the queue to agents, and a router routing transactions from the queue to individual agents who accept the invitation.

24 Claims, 8 Drawing Sheets

(56) References Cited

U.S. PATENT DOCUMENTS

2009/0307610 A1* 12/2009 Ryan ............................ 715/756
2010/0125433 A1* 5/2010 Jordan et al. ................. 702/155
2010/0266115 A1 10/2010 Fedorov et al.

* cited by examiner

MANAGEMENT OF TRANSACTION ROUTING TO ENTERPRISE AGENTS

CROSS-REFERENCE TO RELATED APPLICATIONS

NA

BACKGROUND OF THE INVENTION

1. Field of the Invention

The present invention is in the field of network-based or supported communications and pertains particularly to methods and a system for managing routing of transactions to agents operating on behalf of a host of a contact center.

2. Discussion of the State of the Art

In the field of network communications, call centers or contact centers are enterprises or divisions of larger companies that specialize in communication with customers and fulfilling the goals of those customers. A contact center may specialize in certain types of transacting including sales order processing, technical support, loan consultation, sales prospecting, and other transactional business. State-of-art contact centers may employ automated servicing like interactive voice response (IVR), Web-based interfaces for ordering product and registering for service in addition to retaining live personnel to interact with incoming and outbound telephone contacts, emails, Instant messages, chat requests, and so on.

In a state-of-art contact center there is a seamless integration between Internet protocol network telephony (IPNT) and connection-oriented network telephony (COST). Most callers are first screened for purpose, such as an IVR unit before internally routing those events to live agents.

Live agents working in a state-of-art contact center are tightly controlled within the center and may be stationed at local-area-network (LAN)-connected workstations. Desktop applications are provided that work to report the current status of these agents with respect to call load and general availability of those agents for performing certain tasks including answering phones, working email, running or participating in chat sessions, Instant messaging, and so on. Agents generally must be logged into a contact center workflow system or equivalent and may log out only at defined time periods such as the end of a shift, lunch, and break times during the work period. Therefore, statistics relative to contact center resource availability are used to fine tune call flow through the center to comply with a service objective (SO) of the center.

In some state-of-art contact centers, or elsewhere in the enterprise hosting such a center, there are personnel that are highly skilled and/or have skills of special value that typical contact center agents may not posses. These agents may be considered as special agents. These agents may have many different tasks to perform for the enterprise, and many of those tasks may not involve interaction with a customer. However, such special agents at a contact center are often needed to complete certain transactions that a typical live agent is not qualified to complete because of a special skill or knowledge that they posses.

Often calls are transferred to special agents after live agents interact with customers, and the special agent completes the transaction. Special agents for an enterprise may operate anywhere in the enterprise, or externally as remote agents. For example, a contact center may reside in India where the special agents for the enterprise reside in the states and so on. Therefore, it is not feasible to apply the type of tight monitoring applied to regular contact-center agents to special agents as their responsibilities and work schedules may vary widely. However, it is feasible that special agents available to the contact center system are made visible to the system through rich presence information, login to a network-supported system, or perhaps other voluntary means executed by the special agents themselves.

A problem arises when incoming calls, for example, are answered by IVR, queued for live agents, and then transferred to special agents. The routing at this point is blind because the system does not know if the special agent is at his or her extension, or if they are, whether they are available to engage in the transaction or not. Valuable customers may drop out of the system if they are forced to wait for a special agent for an extended amount of time compared to estimated waiting time (EWT) of a typical call in an agent queue. Without assurance that special agents will be available and if so, able to handle transactions transferred to them in a reasonable time, the service level objectives (SLO) of the contact center may suffer depending on the call load transferred.

In other situations, even live agents dedicated to a call center may be expected to handle many tasks other than interacting with customers through routed events like voice calls and emails, for example. Some live agents may be expected to handle emails, chat sessions and the like, and also to do off-line work as well and therefore may not always be available in an instant to handle a live interaction. So it may be said, in general, that the term agent should be considered broadly as any person operating on behalf of the enterprise and enabled to receive routed events and interact with customers.

Therefore, what is clearly needed in the art is a method and system for routing events to agents, the method and system taking into account the fact that some agents may routinely be engaged in tasks that may occupy their attention, or even take them away from their workstations where they are enabled to interact with routed events.

SUMMARY OF THE INVENTION

A problem stated above is that it is desired for agents having special skills termed special agents in the art to handle certain transactions when skills or capabilities of contact center agents are less than what is required to complete a transaction or when interaction load is too high for live agents of the center to handle alone. However, there are presently in the art no reliable methods for engaging agents having special skills or required to operate part time away from their workstations in customer interaction in the same tightly controlled fashion that live, dedicated agents are subject to in a contact center, without compromising the other high-priority duties typical of such special agents.

Every contact center is driven by interaction flow and is judged by its ability to handle the flow of interaction in a fashion as to be compliant with stated service objectives (SO) and quality of service (QoS) advertised by the center. Most contact centers today employ computer telephone integration (CTI) in telephone switching and routing services in addition to data network telephony switching and routing services to insure that incoming calls and other types of interaction requests are routed to the appropriate contact center personnel to handle those transactions. Interactive voice response (IVR) systems, virtual queue systems, flexible workstations, soft and hard switching apparatus, and intelligent routing routines are typically part of such apparatus.

The present inventors realized in an inventive moment that the varied duty of agents in general invites a new and unique way of routing events. The inventors therefore conceived a unique management system for managing routing of transactions coming into the contact center to certain agents in a fashion that is reliable and accountable and that improves overall call center efficiency and profit.

Accordingly in an embodiment of the present invention a method for routing transactions to agents is provided. The method includes the steps (a) placing the transactions in a queue to be routed, (b) sending invitations to interact with a transaction from the queue to individual ones of the group of agents, and (c) routing transactions from the queue only to invited agents who respond that they are ready to receive a transaction. In one aspect of the method a further step is provided for updating status identifiers for agents relative to invitation and engagement. In a variation of this aspect the status identifier of agents who terminate engagement to a transaction from the queue as ready to receive an invitation. In a further variation to the aspect a preset time delay is applied before updating the status identifier of an agent to ready to receive an invitation.

In one aspect using a status identifier the status identifier for agents who have been sent an invitation, but have not responded, is updated to pending response to an invitation. In a preferred aspect using a status identifier in step (b), a pacing computation is used to determine a rate for sending the invitations, the rate for sending depending at least on rate of incoming transactions, probability that agents with a status of ready to receive an invitation will accept the invitation, and mean handling time for agents interacting with transactions.

In one aspect of the method, in step (b), invitations are withdrawn after a preset time. In one aspect individual agents have access to a computerized appliance with a display, the computerized appliance executing a desktop application for facilitating transaction interaction, wherein indicia is presented on the display for a received invitation, the indicia remaining visible while the invitation is active. In a variation of this aspect the invitation further comprises an audio or a visual signal, or both, at the computerized appliance to alert an agent that an invitation has been received.

In one aspect upon a transaction being routed to an individual agent, information concerning the transaction is provided to the computerized appliance to aid the agent in interacting with the transaction. In this aspect information concerning the transaction comprises at least identity of an initiator of the transaction, and indication of a purpose for the transaction.

Accordingly, in an embodiment of the invention a system for routing transactions to individual ones of a group of agents is provided. The system includes a queue wherein transactions to be routed are placed, a transmission facility sending invitations to interact with a transaction from the queue to agents and a router routing transactions from the queue to individual agents who accept the invitation. In one embodiment the system further comprises a data repository storing status identifiers for agents relative to invitation and engagement. In this embodiment the system updates status identifiers for agents to whom a transaction has been routed, and who have connected to the transaction as engaged in a transaction.

In one embodiment the system updates status identifiers of agents who terminate engagement to a transaction from the queue as ready to receive an invitation. In this embodiment a preset time delay is applied before updating the status identifier of an agent to ready to receive an invitation. In one embodiment the system updates the status of agents who have been sent an invitation, but have not responded, as pending response to an invitation.

In one embodiment the transmission facility transmitting invitations computes and conforms to a rate for sending the invitations, the rate depending at least on rate of incoming transactions, probability that agents with a status of ready to receive an invitation will accept the invitation, and mean handling time for agents interacting with transactions. In one embodiment invitations transmitted to agents are withdrawn after a preset time.

In a preferred embodiment individual agents have access to a computerized appliance with a display, the computerized appliance executing a desktop application for facilitating transaction interaction, wherein indicia is presented on the display for a received invitation, the indicia remaining visible while the invitation is active. In a variation to this embodiment the system further comprises an audio or a visual signal transmitter, or both, at the computerized appliance to alert an agent nearby that an invitation has been received. In another variation to this embodiment upon a transaction being routed to an individual agent, information concerning the transaction is provided to the computerized appliance to aid the agent in interacting with the transaction. In this variant embodiment information concerning the transaction comprises at least identity of an initiator of the transaction, and indication of a purpose for the transaction.

BRIEF DESCRIPTION OF THE DRAWING FIGURES

DETAILED DESCRIPTION

The inventors provide a system and methods for incorporating agents for transaction handling by invitation. The enabling details of the present invention are given in the following examples, which may represent more than one embodiment of the invention.

Figure 1:
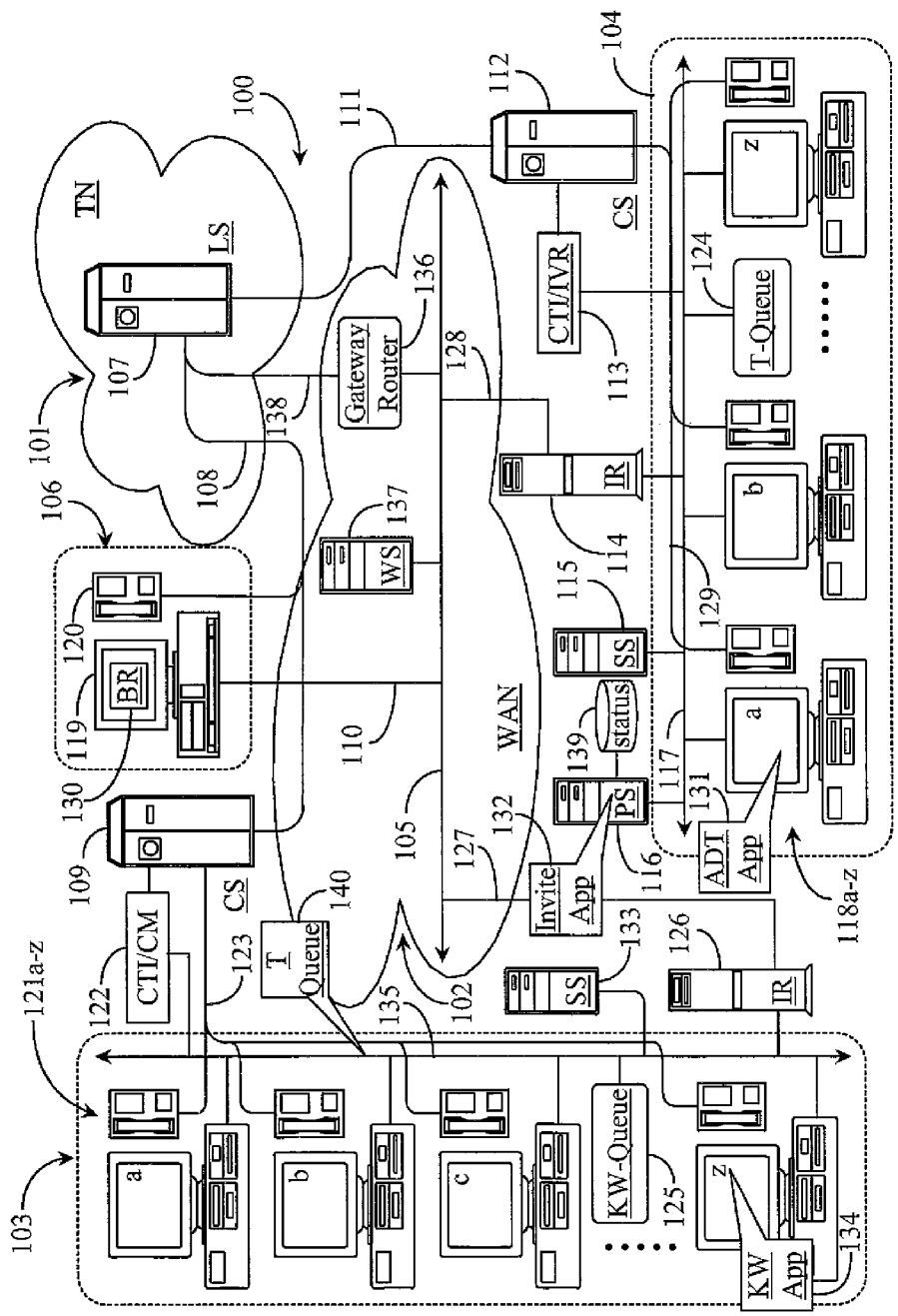
FIG. 1 is an architectural diagram of a communications network supporting invitation of certain agents to handle transactions in an embodiment of the present invention.

FIG. 1 is an architectural diagram of a communications network 100 supporting invitation of agents to handle transactions in an embodiment of the present invention. Communications network 100 supports seamless telephony communication between contact center live agents and other agents not dedicated full time to interacting with routed events. The network provides support for all communications types including connection-oriented-switched-telephony (COST) and data-network-telephony (DNT), including Internet-Protocol-network-telephony (IPNT), a sub-set of DNT.

Communications network 100 includes a wide-area-network (WAN) 102 and a telephone carrier network (TN) 101. WAN 102 may be a corporate WAN, a private or public WAN, a municipal area network (MAN), or the well known Internet network. TN 101 may be a private or public telephone network including wireless or wired network or a combination of the two. In one embodiment TN 101 is the public-switched-telephone network (PSTN). WAN 102 is further characterized in this example by a WAN backbone 105, which may include all of the lines, equipment, and access points that make up the network as a whole including any connected sub-networks. In the case of the WAN 102 representing the Internet network, there are no geographic limitations to practicing the present invention.

A contact center 104 is illustrated in this example and represented by a grouping of dedicated-agent workstations 118a-z supported by an internal local-area-network 117. Agent workstations 118 a-z are logically represented by parings of an agent computing device, in this case a desktop computer with a video display unit (VDU) and a telephone. Each agent computer is connected directly to LAN 117 and may be used to handle certain transaction and perform other tasks relevant to enterprise business.

A central office telephone switch (CS) 112 is illustrated in this example and represents a local telephone switch to the contact center grouping of agents. CS 112 may be a private branch exchange (PBX) switch, an automatic call distributor (ACD) switch, a soft switch implemented in software, or any other facility capable of processing telephone calls. In this example, agent telephones illustrated within agent workstations 118a-z are connected to CS 112 via internal COST telephony wiring 129. PBX telephones may also be provided and soft telephones may be provided to execute and run on agent computers. CS 112 may be maintained by the contact center or it may be external to the center but leased by the center to provide telephone switching services.

CS 112 in this example is computer telephony integrated (CTI) by way of a CTI processor 113 connected thereto by a CTI link. CTI processor 113 is connected directly to LAN 117 and provides agent level routing (ALR) intelligence to the switch. An interactive voice response (IVR) system is illustrated logically herein in combination with CTI functionality. Calls from outside the contact center are routed to CS 112 for IVR interface and internal routing to available agents and automated systems.

CS 112 is connected to a local telephone switch (LS) 107 in TN 101 by way of a telephone trunk 111. LS 111 may be an ACD, PBX, or service control point (SCP). All calls incoming to LS 107 destined for the contact center determined by destination number identification service (DNIS) are routed to CS 112 over trunk 111 for servicing.

LAN 117 supports a network router exemplified herein as an Internet router (IR) 114 following an embodiment wherein WAN 102 may be the Internet network. IR 114 has access to WAN backbone 105 via an Internet access line 128.

In a preferred embodiment access line 128 is a high-speed access line connected on a 24/7 basis.

LS 107 has connection to WAN backbone 105 by way of a gateway router 136 connected to the switch by telephone trunk 138. Gateway router 136 logically represents any type of network gateway adapted to enable seamless cross transfer of telephone calls between the networks including enhancement for call control features and media applications.

A second group of agents 103 is represented in this example as a grouping of agent workstations 121a-z. Workstations 121a-z are represented by pairings of computing devices and telephones like those pairings described within the first grouping of agents. Each workstation includes a computer with a VDU and a telephone. Each telephone illustrated within the grouping of workstations 121 a-z has connection to a CS 109 via internal telephone wiring 123. CS 109 may be analogous to CS 112 connected to the telephones of CC agent workstations 118a-z. Like CS 112, CS 109 is enhanced for intelligent routing via a CTI processor 122 connected to the switch via a CTI link. CTI processor 122 is connected to a LAN 135 implemented within the facility or department hosting the second grouping of agents. CS 109 is connected to LS 107 within TN 101 via a telephone trunk 108.

In this example, agents in facility 103 are physically remote from agents working in contact center 104. LAN 117 does not have direct network access to LAN 135. WAN 101 may provide connectivity between the two systems, and may be an intranet or Ethernet connecting the two systems together for networking purposes. In another embodiment facility 103 housing the second group of agents and contact center 104 are geographically remote from one another and WAN 101 is the Internet network. In another embodiment contact center 104 may include remote agents accessing LAN 117 via the Internet, such as through a virtual private network (VPN). Likewise, facility 103 may include home-based agents that access LAN 135 via the Internet network.

LAN 135 in facility 103 supports an IR 126 providing access for the second group of agents to WAN backbone 105 via a WAN access line 127. Access line 127 is a high-speed access line in a preferred embodiment connected on a 24/7 basis. Each facility (103, 104) is capable of processing both COST telephone transactions as well as DNT transactions. Both facilities are also assumed to be multimedia-capable facilities able to interact with messaging, including short message service (SMS), multimedia service (MMS), IM, and email correspondence. Both facilities are assumed capable of handling chat interaction and Web transactions. By transaction in this specification is meant a routed event, one example being a voice telephone call.

LAN 117 within contact center 104 supports a transaction queue (T-Queue) system 124 for queuing transactions for agents that are operating workstations 118a-z. Queue 124 may represent any of the types of transactions that these agents may be capable of handling. Queue 124 is logically represented herein and represents queuing functionality on a whole. In actual practice there may be many different queues dedicated to certain transaction types or by any other criterion. Queue 124 contains virtualized events representing transactions waiting for agents. Queue 124 may have an imposed estimated waiting time (EWT) maximum. Facility 103 also has a queuing system 125 connected to LAN 135. Queue 125 queues transactions to be routed to agents in the second group who have accepted an invitation to receive a routed transaction. Facility 103 may contain other queue systems without departing from the spirit and scope of the present invention such as a queue representing transactions to be handled by the second group of agents.

CTI processor 122 includes a software (SW) implementation of a call monitor (CM) for monitoring calls handled by special agents taking such information as handling time for each call and like statistical data. It may be noted herein that dedicated agents may also operate in facility 103 without departing from the spirit and scope of the invention. The segmentation of the overall system into two groups of agents is simply to better illustrate the difference in routing to dedicated agents and routing to agents by invention in embodiments of the present invention.

Statistics generated from interaction activity within facility 103 are stored and are servable from a statistics server (SS) 133 supported by LAN 135. SS 133 includes an internal or externally accessible digital medium, which may be a data repository for storing data and memory for enabling execution of applications. A statistics server 115 is illustrated within contact center 104 and is connected to LAN 117. Statistics server 115 is adapted to store and serve statistics about contact center interaction activity, agent availability, EWT, call handling time, and so on. SS 115 includes an internally or externally accessible digital medium, which may be a data repository for storing data and memory for enabling execution of applications.

In this embodiment facility 103 containing the second group of agents and facility 104 containing the dedicated agents are not directly integrated. This is not a limitation of the present invention but illustrative of the need to route to different agents depending on the nature of the job descriptions of the agents. Agents within facility 103 may not follow a strict schedule. These agents may not be confined to certain areas or workstations. They may be performing tedious tasks like programming, writing code, debugging systems, or similar technical duties. They may be bank tellers or airline ticket agents, for example. In many cases, a special agent may be required to assist in or to take over a transaction initiated during interaction between a customer and a dedicated agent. One challenge mentioned further above is how to reliably engage agents whose jobs require periodic absence from a workstation to assist in CC transacting without distracting them entirely from their important duties within the enterprise. It is also noted herein that in some embodiments some of the agents may not be employees of the host enterprise. Facility 103 in such an embodiment may provide services to contact center 104 on a contract basis.

In one embodiment of the present invention contact center 104 routes transactions to facility 103 for agent level routing (SALR) under certain circumstances. A pacing server (PS) 116 is provided in this embodiment within contact center 104 connected to LAN 117. PS 116 includes an internal or externally accessible digital medium, which may be a data repository for storing data and memory for enabling execution of applications. A data repository 139 is illustrated in this example and may be dedicated, among other things, for storing status indicators of agents relative to their status as a prospect for receiving an invitation, pending acceptance of an invitation, or available to receive a transaction. Pacing server 116 hosts a SW application referred to herein as an invite application 132.

The term pacing refers to a controlled frequency of sending invitations out to certain agents, in this case the agents in facility 103, to solicit engagement of those agents to handle or finish transactions initiated by customers or by agents of contact center 104. Pacing server 116 with the aid of invite application 132 is also adapted to send invitations to prospective customers of the contact center in one embodiment. More detail about pacing invitations to special agents and to CC customers is provided below in this specification. PS 116 may subscribe to certain statistics available through SS 115 in order to generate an appropriate invitation rate.

Each computer/VDU in workstations 118a-z has a SW application referred to herein as an agent desktop (ADT) application 131. An agent desktop application such as ADT 131 is known to the inventors as a SW application executable from the desktop and operated by agents, that enables each agent to log-in to a centralized control and monitoring station (not illustrated) so that their collective status can be monitored and so the agents themselves may be managed in terms of work assignments and the like. ADT application 132 reports to SS 115 all of the appropriate statistics related to agent status, workflow, and activities. ADT application 132 may also, in some instances, be used to route transactions from the desktop to other agents, special agents or automated systems, or to return transactions to a router to be routed elsewhere. When incoming transactions enter queue 124 agents targeted for agent level routing ALR may be notified of the activity and may be prepared to handle transactions by scripting, receipt of customer and product data, and the nature of the transaction before a transaction is routed to the agent over LAN 117 to the agent's PC/VDU or to the agent's telephone from CS 112.

Certain statistics are compiled about the collective state and activities of all of the agents such as agent availability (for each agent), interaction load on the whole system (spread over all agents), average transaction handling time, and so on. From these statistics other states may be discerned like estimated waiting time (EWT) in queue 124. In a typical contact center, some calls arriving at switch 112 may be disposed of by IVR without routing to a live agent. Calls that require live assistance as determined through IVR interaction in this example may be queued for an available agent in agent queue 124.

Some of the transactions queued in queue 124 for live agents can be disposed of by the agents without requiring a special agent to assist or to take over the transaction. However, a portion of the queued transactions may require the expertise of a special agent to successfully complete the transaction. In one embodiment IVR interaction with a caller may determine that a special agent rather than a dedicated agent should be the target of routing and the only entity that should receive the transaction. One with skill in the art of transaction handling through CC resources will agree that the mechanics of who can handle a transaction to completion and who cannot (including automated services) depends on the nature of the enterprise and the qualifications of those in place to transact with customers of the enterprise. For example, a first agent may be able to handle a request for a second mortgage whereas a special agent skilled in refinance might be required to finish a complete refinance with cash out. There may be many variations on this theme. In general the system routes transactions to individual ones of a group of second agents who have accepted invitations to engage customers.

The transactions are queued in a queue such as in queue 140 waiting for routing to an available agent. Data repository 139 in one embodiment contains recorded status identifiers for individual agents in the group. A transmission facility sends invitations to interact with a transaction from the queue to agents having a status identifier in the data repository indicating they are ready to receive an invitation.

These are considered prospects determined available for access by the contact center system.

The pacing server may also serve as a facility for updating the status identifiers of agents. IR 114 aided by CTI processor 113 may route transactions from queue 124 to individual agents whose status identifier indicates ready to take a transaction. In the case of voice calls, CTI function routes calls connected to switch 112 to switch 109 where they may be queued for a ready special agent. In one embodiment a transaction queue (T Queue) 140 is provided and connected to LAN 135 in facility 103. Transaction queue 140 may be adapted to manage transactions that have been routed to available agents that are sharing the queue.

A customer station 106 is logically represented in this example. Customer station 106 represents any customer of contact center 104 that may initiate a connection to the center using a computing appliance such as a computer 119 having a VDU using a browser (BR) 130, or a customer telephone 120. Computer 119 has access to WAN 102, more particularly to backbone 105 via a network access line 110. Network access may be achieved by any of several known methods including cable/modem, dialup, broadband, satellite, digital services line (DSL), etc. In some cases access may be through a service provider such as an Internet service provider (ISP). Other network-capable appliances may be used to access center 104 like a cellular telephone with network access capabilities, a personal digital assistant, or a laptop computer. Customer telephone 120 has access to LS 107 in TN 101 via a telephone line.

In one embodiment contact center 104 needs to route certain transactions to agents working within facility 103. However, before transactions can be routed to facility 103 for service by that group of agents the center has to be sure that agents will be available and ready to take calls and handle the transactions. If there are not enough available agents to handle the amount of transactions pending that require their services, then customers may drop off the grid causing the center to lose business and the service objective (SO) of the center may be compromised. If there are too many available agents waiting to handle too few transactions, then the efficiency and profit derived from the other tasks performed by those agents in the enterprise may suffer. Pacing server 116 with the aid of invite application 132 utilizes available information to predict how many invitations should be sent to agents that will be needed to handle the number (call load) of incoming transactions that are expected to require their services.

Invite application 132 relies on a pacing algorithm to determine an optimized frequency for sending the invitations. The selected frequency may vary over time based on the latest incoming statistics relied upon for pacing adjustment over a time period. Agents are invited to accept a transaction on a transaction-to-transaction basis in one embodiment, meaning that every transaction routed to an invited agent is preceded by an acceptance by the agent of the invitation to receive a transaction. The optimum pacing frequency selected depends on calculation of many variables. For example, of all incoming calls (call flow intensity) a portion will need live assistance by an invited agent. The variable can be predicted from analyzing historical statistics from a same or similar campaign.

In a preferred embodiment the IVR will determine to which group of agents a call should be routed. Therefore, some transactions may be routed directly to agents in the second group, managed by invitation, and some to dedicated agents in the first group. Pacing server 116 has to send enough invitations to ensure that enough invited agents will be available to handle all pending transactions. Upon a transaction being routed to an individual invited agent, information concerning the transaction may be provided to the computerized appliance to aid the agent in interacting with the transaction by telephone or other medium. In one embodiment information concerning the transaction comprises at least identity of an initiator of the transaction, and indication of a purpose for the transaction.

The pacing computation as described above is used to determine a rate for sending the invitations. The rate of send depending at least on the current rate of incoming transactions, the probability (P) that special agents with a status of ready to receive an invitation will accept the invitation, and the mean handling time (t) for special agents interacting with transactions until completion.

Of all candidate agents in the second group, some may reject invitations sent to them, some may not be available to accept invitations, and some will accept invitations sent to them and will be available to handle transactions. State statistics about activities of agents and historical statistics about agent's performance within the system may be obtained by SS 115 from SS 133 through Internet 101 on a continuous basis. Call monitoring of agent participation in handling transactions can provide further useful statistics such as average call handling time. Incidents of invitation rejection and time out (not rejected or accepted) within a specific time period from service of the invitation are propagated back to the originating invitation transmission facility, in this case PS 116. These types of statistics are used to estimate and then refine the frequency of sending invitations from server 116. It is noted that facts occurring in real time in the system can change the frequency of invitation over the course of a campaign or work period.

In practice of the invention invitations from PS 116 may be in the form of messages comprising some visual and/or audio alert function. The invitation may include an audio or a visual signal, or both, at the computerized appliance or other designated appliance to alert a special agent at the appliance or nearby that an invitation has been received at the appliance. The message display may be interactive such that an agent may click the message (displayed on VDU) to accept the invitation. Upon acceptance of an invitation, the system routes a transaction to the special agent within a reasonably short amount of time, generally not more than a few seconds. The actual time between acceptance of an invitation and receipt of a transaction may depend in part on the nature of the media of the transaction. In this example an invitation from server 116 may be routed onto WAN 101 through router 114 and then onto LAN 135 through router 126 and onto a desktop operated by an agent or to another networking appliance operated by the agent.

An invitation sent to an agent, or more particularly, to a network appliance of the agent, may carry a specific time-to-live (TTL) whereby, if it is ignored beyond the TTL, it is considered rejected by the system. Invitations that are rejected physically or that expire become a variable statistic that is fed back into the pacing algorithm for managing the frequency of invitation. After receiving acceptance of an invitation sent from PS 116 a transaction may be routed to that agent within a specific period of time acceptable to the system. The time to answer (TTA) is measured from receipt of acceptance of the invitation to pickup of the transaction. The system may update the status identifier for agents who have been sent an invitation, but have not responded, as pending response to an invitation until the TTL for the invitation expires.

In one embodiment a method for routing transactions to agents includes placing the transactions in a queue analogous to T-queue 124 or T-queue 140 of FIG. 1 to be routed to agents. Invitations to interact with a transaction from the queue are then sent to individual ones of the group of agents. The transactions are routed only to invited agents who respond that they are ready to receive a transaction. The system may manage status identifiers (ready or not ready) for routing to special agents in a pool. The system sends invitations from pacing server 116 to agents that have a status indicating that they are ready to receive an invitation. The invitations are for soliciting the agent to accept a single transaction waiting in queue. After an agent receives an invitation the system may update status of that agent having received and accepted an invitation as ready to take a transaction from queue. Transactions are routed from queue to individual agents with ready status. After an agent completes a transaction, the status of that agent to whom a transaction has been routed, and whom has at least engaged in the transaction, is updated.

In one example relevant to the architecture presented here, an agent engaged in a transaction in contact center 102 at one of stations 118*a-z* may determine that the transaction needs to be transferred to a different agent. In one embodiment a desktop application 134 is provided to all workstations of participating agents to whom routing may be done by invitation. An agent may, through this application, be enabled to configure preferences how invitations will be received and when they will be received. In one embodiment an agent may, using application 134, select which computing or network communication devices will be configured to receive invitations. In one embodiment transactions are pushed to accepting agents based on first available agent who has accepted an invitation. After an agent has handled a transaction, he or she then becomes a candidate agent to which a next invitation may be sent. In another embodiment the desktop application 134 enables an agent to subscribe to a general queue such as queue 140. If a special agent accepts an invitation he or she may then be enabled to open the queue and select a transaction to handle. There are many variant possibilities.

In one embodiment the IVR interacting with callers at switch 112 may directly transfer a call to switch 109 through LS 107 without routing the call to any agent in contact center 104. An invitation sent to an agent may take the form of a toast display that appears on a desktop operated by the agent. An invitation may take the form of an interactive pop-up message that appears on a VDU operated by the agent when the host computing appliance is online and ready to receive messages. In one embodiment session initiation protocol (SIP) may be used to propagate the invitations. It is noted that invitations have a TTL so that if an agent does not accepts an invitation and the TTL expires the server counts the invitation as a rejected or failed invitation. The system may update the status identifier of agents who terminate engagement to a transaction received from queue as ready to receive an invitation. In one embodiment this is done after a preset delay period.

In another embodiment of the present invention invite application 132 running on PS 116 is adapted to send invitations to prospective customers that may be browsing a company Web site for example. In this case a pacing algorithm may be used to predict how many invitations to send to prospects connected online at a Web site. A Web server (WS) 137 is illustrated in this example and is connected to network backbone 105 in WAN 102. WS 102 may host an enterprise Web site that is serviced by contact center 104. In this embodiment two sets of invitations are sent out, one set of invitations to prospective customers and one set of invitations to prospective agents. In this embodiment both sets of invitations are subject to pacing, meaning that they are not all sent at one time but sent at a rate determined by algorithm and computation. Customers who accept the invitations may be added to an outbound campaign list used by an automatic dialer (not illustrated) to place calls to those customers. Connected calls are then treated as incoming calls.

Figure 2:
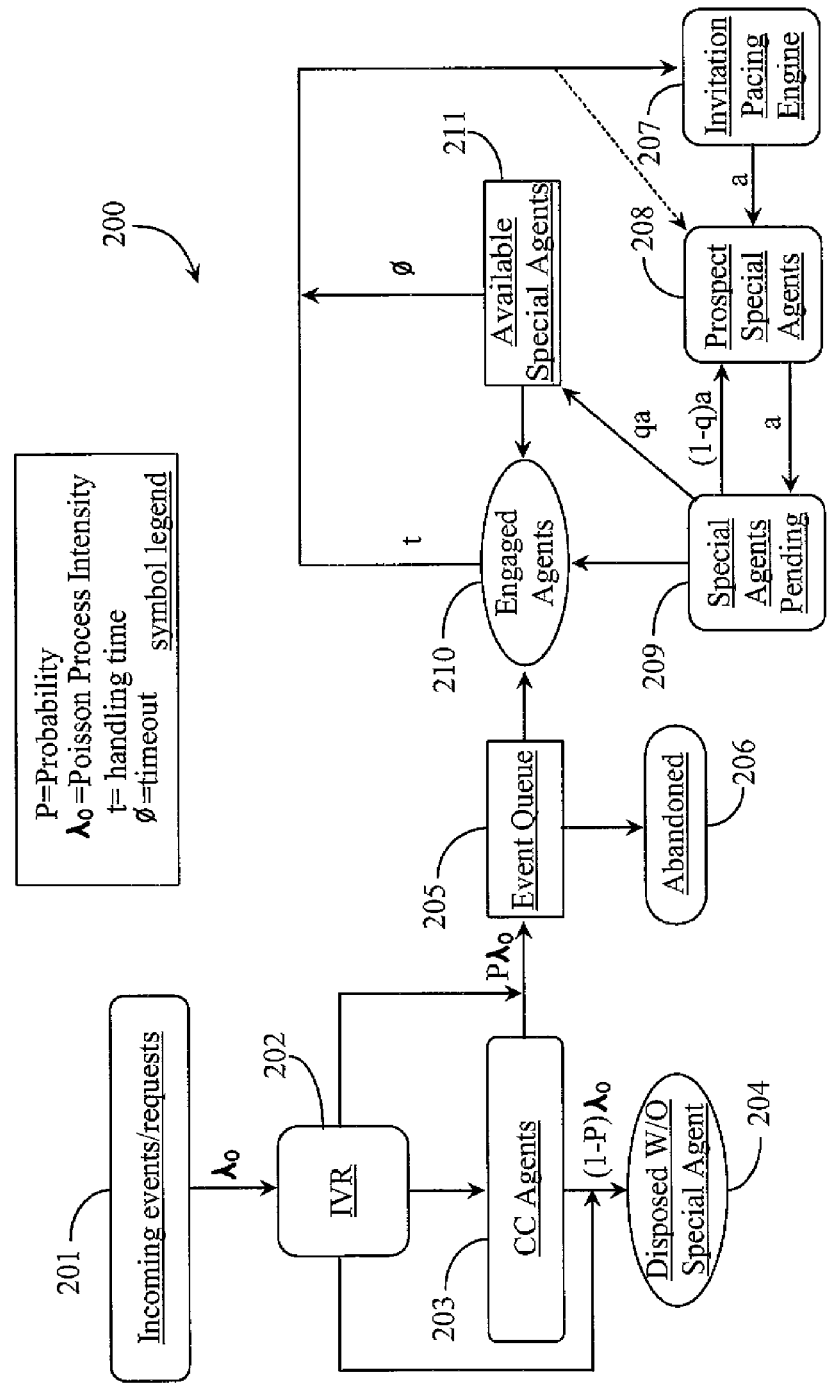
FIG. 2 is a block diagram illustrating a system for engaging certain agents into interaction with customers in an embodiment of the invention.

FIG. 2 is a block diagram illustrating a system 200 for engaging agents into interaction with customers in an embodiment of the invention. System 200 is logically illustrated using blocks that represent certain components of the system including queue components. Incoming events/requests 201 enter the contact center system on an ongoing basis. The incoming events are mathematically represented by intensity relative to a Poisson process ($\hat{o}$). The Poisson intensity may in one embodiment, include all incoming events that may be potential candidates for live servicing by a special agent. The events may represent both COST events and DNT events including VoIP, electronic text, video mail and messaging.

In this example, an IVR 202 is used to receive incoming events 201. Therefore, in this example the incoming events may be voice calls destined for the contact center. Such calls may be COST and/or IPNT calls. In one embodiment the calls are to the company Website and a voice browser is presented through IVR 202. IVR 202 may be adapted to direct calls according to one of several available options. For example, there is a certain probability (P) that some of the incoming calls will need an agent with certain skills to handle the transaction successfully. This value may be expressed as $P(\hat{o})$.

There may be more than one option for engaging an agent to handle an incoming event. In one embodiment IVR 202 may route calls directly to agents in one group in some cases where a dedicated agent is not required to contribute to the transaction. In the same or another embodiment a portion of incoming events 201 may first be routed to a dedicated agent who may determine if a different agent is required to handle or finish handling the transaction. Still further, a portion of incoming events at ($\hat{o}$) may be handled solely by a direct agent or by IVR process represented herein as block 204. The events that may be disposed of without requiring an invited agent may be expressed as $(1-P)\,\hat{o}$.

In this example a prediction is made concerning how many invitations should be sent to agents to ensure their availability for handling a predicted number of incoming events that will require assistance of a these agents. The algorithm takes into account the probabilities discussed above relative to the portion of incoming events that are expected to require an invited agent. Initially this variable can be calculated based on past contact center history relative to a similar campaign. As the system operates to connect customers with invited agents, the variable may be fine-tuned with the benefit of analysis of current percentages in real time. A goal is to ensure that enough invited agents will be available to service the calls that require their skills to complete the transactions.

Incoming events that require assistance from an invited agent are deposited into an event queue 205 to wait for the next available agent who has accepted an invitation to take a call. Some of the events that enter queue 205 may drop out of queue and become abandoned calls represented by block 206. The numbers of abandoned calls may be minimized if the correct numbers of invitations have been sent resulting in a sufficient acceptance ratio providing a sufficient number of agents to handle the transactions queued for them. EWT in queue should not exceed a reasonable wait time. As the system operates, higher abandonment rates attributed to block 206 may result in an increase in invitations sent to compensate. An agent abandonment rate (AAR) may be reduced significantly with the appropriate number of invitations. It is assumed here that there are many more agents available to the system than are required to handle all of the incoming calls. On the opposite end of the system, an invitation pacing engine 207 is provided to determine the correct number of invitations to be sent to agents. Pacing engine 207 may generate and send the invitations on an ongoing basis such as a Poisson intensity based on the results of a continuously firing algorithm. Invitation pacing engine 200 may be analogous to invite application 132 running on pacing server 116 of FIG. 1. The intensity of invitation send may be expressed as a.

Invitations are sent to prospect or candidate agents represented herein by block 208. Of the prospect agents, there is a probability that they will reject or otherwise ignore the invitation sent to them from the system. This is expressed in this example as (1−P) a. A TTL may be placed on each invitation sent so that all ignored or missed invitations can be counted as rejections along with those that are manually rejected using an interactive option embedded in the message of the invitation. An invitation may take many forms and may appear as a pop-up message alert, a TOAST, an IM, a telephone invitation, etc. An invitation sent to an agent may be propagated to more than one device operated by the agent to reduce the chance of the agent missing an invitation that otherwise would have been accepted. In one embodiment agents are enabled through an interface to configure how and where invitations will be propagated to them.

All agents that have received invitations but have not yet accepted the invitations are classed as agents pending represented by block 209 in this example. In one embodiment a read receipt may be instantly sent back to the system every time a special agent opens or reads an invitation. In this way the system may determine if an agent is simply ignoring the invitation. Such statistics may help to fine tune the total intensity of the invitation campaign. For example, if an agent consistently ignores invitations to engage customers, the system may drop that agent from consideration as a prospect in future campaigns.

There is a certain probability expressed as (qa) that a number of pending agents 209 will accept the invitations sent to them thus becoming eligible to handle a transaction. A pool of agents engaged currently with transactions is represented by block 210. The queuing system is represented logically herein. In actual practice agents may share one or more than one queue. In one embodiment each agent has his or her own queue.

It is noted herein that the agents engaging the customers are not required to be located in a same place of business. Some may be home-based or mobile agents; some may be resident at one physical location; while others may be resident at another physical location and so on. In either case, distributed queues or a central queuing system may be provided and adapted to work in the system of the present invention. In one embodiment of the invention dedicated agents handle all transactions until peak periods when ETWs in queue reach a critical value. The pacing engine can then invite agents into play during those peak periods to take the load off of the dedicated agents.

A block 210 represents current transactions in progress with agents. In one embodiment all agent/Customer transactions are monitored and the average time (t) it takes for the agent to handle a transaction is recorded and updated to pacing engine 207 to help refine predictions. All agents who have handled a transaction and those that timed-out are relisted as prospective agents to receive a next invitation to engage customers.

It will be apparent to one with skill in the art of telephony systems that some illustrated components in this example are not required in order to practice the invention. In one embodiment an IVR may not be used and dedicated agents take the calls directly from the switch. In another example all calls requiring an invited agent are routed directly to queue 205 and no dedicated agents are working those calls.

Figure 3:
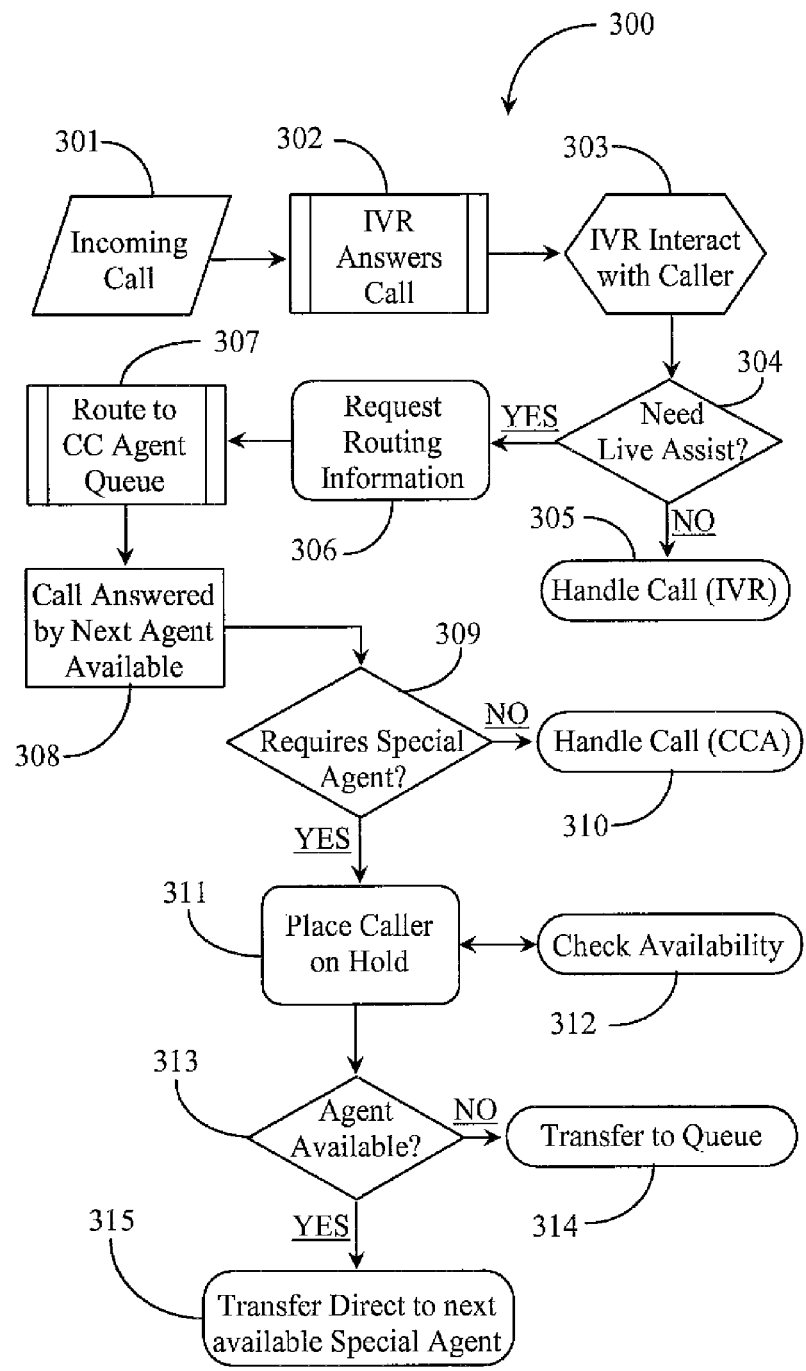
FIG. 3 is a process flow chart illustrating steps for transferring transactions to certain agents in an embodiment of the invention.

FIG. 3 is a process flow chart illustrating steps 300 for transferring transactions to agents in an embodiment of the invention. At step 301 an incoming voice call arrives at a contact center switch. It is noted herein that the process may be somewhat different for some other types of incoming events. In this example it is assumed that all of the events are voice calls. Also in this example, an IVR is provided for interfacing with the callers. An IVR, however, is not required to practice the invention. At step 302 an IVR answers the call. At step 303 the IVR interacts with the caller to determine a purpose of the call.

At step 304 the system makes a decision whether the caller needs live assistance or not. If the system decides that the caller does not require live assistance, at step 305 the IVR completes the transaction and the process ends for that call. In this case statistics are returned to the pacing engine for refining the intensity of invitations sent to special agents.

If the system determines that the caller requires live assistance at step 304 then at step 306 the system requests routing information to route the call to a live dedicated agent, which is performed at step 307. In one embodiment the destination is a shared queue. The call is answered from queue by the next available live dedicated agent. In this example the IVR does not determine if special skills are required to complete the transaction. In this example the dedicated agent makes that determination. At step 309 the dedicated agent makes a decision if treatment of the call will require an invited agent. If the dedicated agent determines that no special skills are required, then at step 310 the dedicated agent completes the transaction. In one embodiment the call is monitored for statistics and the fact that the caller did not require an invited agent to finish the transaction is reported to the pacing engine. This may be performed for each and every connected call.

If the dedicated agent determines that the call requires an invited agent to finish the transaction at step 309, then at step 311 the caller may be placed on hold temporarily while the dedicated agent using a desktop application analogous to ADT 131 running on agent station 118a of FIG. 1 may check availability at step 312 to determine if an invited agent is available to handle the transaction. The system determines if there is an available agent to handle the call at step 313. If an agent is not found to be immediately available at step 313, the dedicated agent may transfer the call to the event queue analogous to queue 205 of FIG. 2. If there is an available agent at step 313, the dedicated agent may transfer the call directly to the other agent at step 315.

Execution of step 314 assumes that all of the agents that have accepted invitations to engage customers are currently busy with customers. In one embodiment there is no IVR interaction. In this case a dedicated agent or qualified live operator answers the calls at step 302 and interacts with the callers at step 303. In this case steps 304 through 308 may not be required. In another embodiment the IVR may determine through interaction at step 303 that live assistance with an agent is required to handle the transaction. In this case the process may skip over to step 311 and the IVR routes directly to invited agents or to an event queue where the transaction is handled by the next available invited agent.

Figure 4:
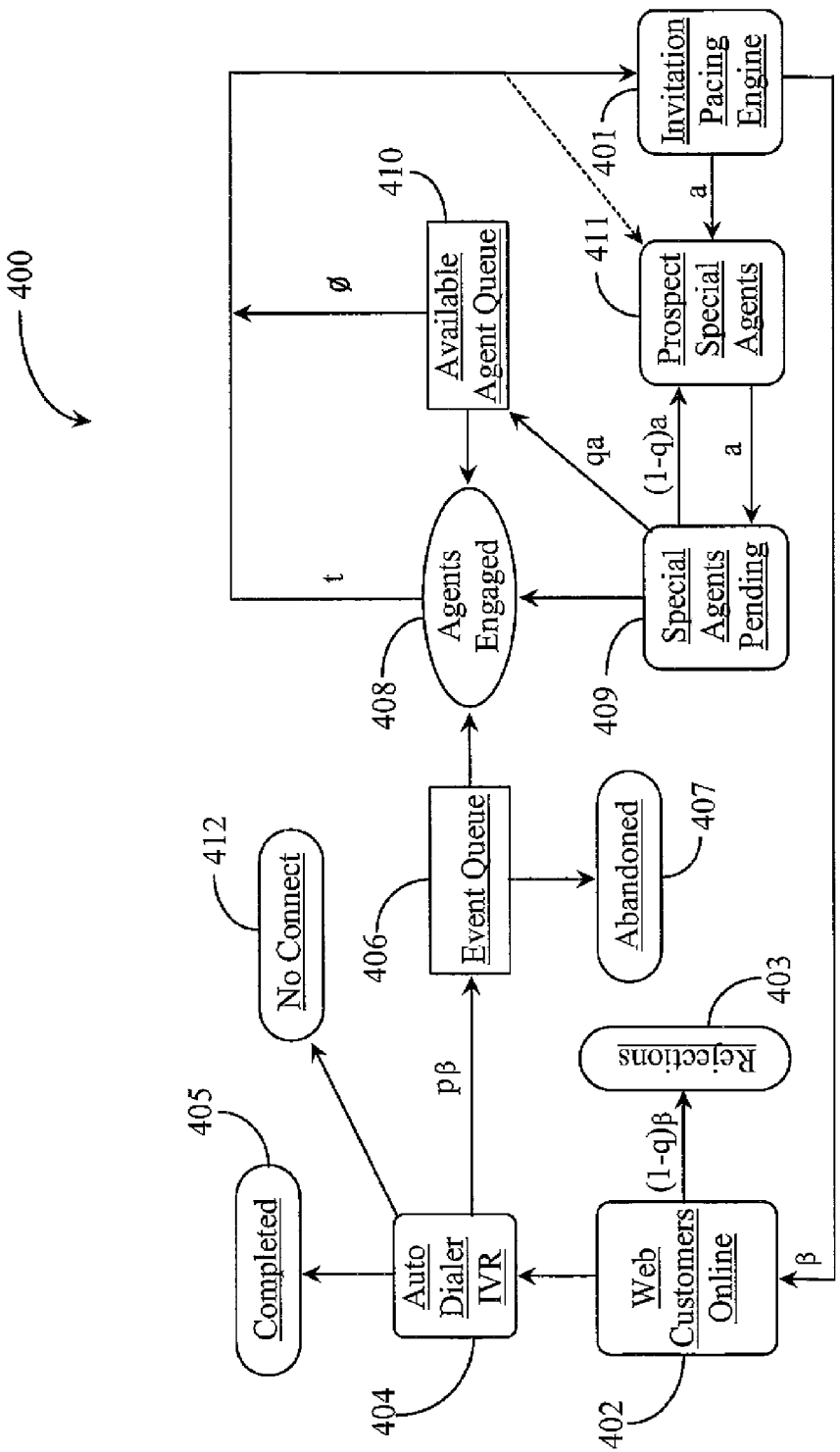
FIG. 4 is a block diagram illustrating a system for engaging certain agents into interaction with customers in another embodiment of the invention.

FIG. 4 is a block diagram illustrating a system 400 for engaging agents into interaction with customers in another embodiment of the invention. System 400 is different from system 300 described further above in that both prospective customers are invited to interact with the contact center while prospective agents are invited to engage the customers.

A pacing engine 401 is provided that is adapted to generate and send invitations to both customer prospects and special agents. Pacing engine 401 predicts the intensity β of invitations to send to customers who are detected online at a company Web site represented herein by a block 402 (Web customers Online). Prospective customers may be online in a chat room instead of online at the Web site. In one embodiment prospective customers are solicited from multiple network access points including but not limited to partner site Web pages, advertisement interfaces, or any other network location that can be reported through presence information to the system. In still another embodiment prospective customers may be solicited by IVR as part of an outbound dialing campaign. A combination of the methods described above may be implemented to invite customers, wherever they may be, to engage the contact center.

It is probable that some of the solicited customers online will reject or ignore the invitation. The probability of rejections 403 is expressed as $(1-q)\beta$. Invitations sent to online customers may be of the form of pop-up alerts that appear in the customer's browser window like invitations sent to agents. The invitations are interactive in a preferred embodiment enabling the customer to accept or reject the invitation. Customers who accept the invitations to engage the contact center are added to an outbound dialing campaign list to be called by an outbound dialer 404 connected to the IVR system.

Various states are possible concerning the customer prospects who accept the invitations. For the purpose of accounting, invitations sent proactively to online or other network-based customers may have a TTL associated so that the system can discern how many were manually rejected through interaction with the invitation and how many were just ignored by the customer. The pacing algorithm that determines the send frequency of invitations takes into account the probability Pβ that a number of solicited customers will require the services of an agent once connected to the CC system (IVR). Some calls made by dialer 404 may go unanswered or may be answered by a machine resulting in no-connect or failed call attempts 412. Some calls dialed are connected and may be completed by IVR without the need for an agent. These calls are represented in this example as transactions completed 405. A certain probability exists that a number of these calls, once connected, will need an invited agent to finish the transaction. This is represented by Pβ in this example as described further above.

The IVR may then transfer Pβ calls to an event queue 406. A small percentage of these calls may be abandoned as is represented herein by block 407. If there are sufficient agents on hand to answer events in queue 406, the abandonment rate may be reduced or eliminated altogether. Connected calls are treated as incoming calls from the perspective of IVR treatment. Although not illustrated in this example, some connected calls may be routed to dedicated agents instead of invited agents.

Pacing engine 401 generates and sends invitations to agents in the same fashion described further above. Prospects 411 are solicited. Pending agents 409 are classed as those who have received an invitation but have not yet accepted or rejected the invitation. Engaged agents 408 illustrate the special agents that are currently busy engaging the customer in a transaction. A timeout (θ) and a time to handle (t) are measured for each transaction by a call monitor. These statistics are fed back into pacing engine 401.

In this example pacing engine sends two types of invitations. One type is sent to prospective customers while the other is sent to prospective special agents. In this example the pacing engine relies on a predicted number of outbound contacts that are connected and that need services of an agent. Initial predictions may be based on historical proactive outbound campaigns run by the same system. As the system runs, call monitoring and statistics mining help to fine-tune the system.

Figure 5:
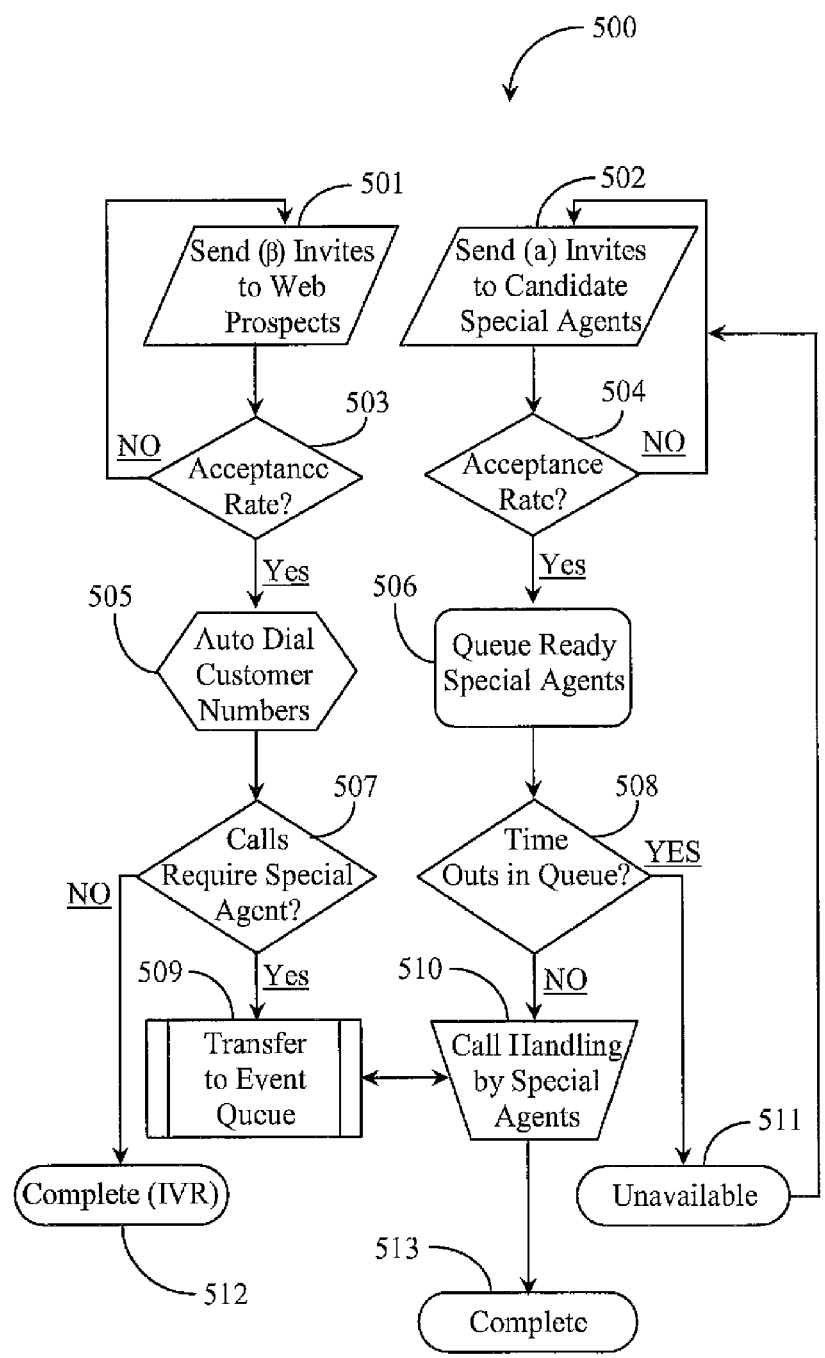
FIG. 5 is a process flow chart illustrating steps for proactive invitation of Web customers to engage certain agents per invitation acceptance in an embodiment of the invention.

FIG. 5 is a process flow chart illustrating steps 500 for proactive invitation of Web customers to engage agents per invitation acceptance in an embodiment of the invention. This process relates to the embodiment described in FIG. 4 wherein the pacing engine generates and sends invitations to prospective customers online and to prospective agents. At step 501 in one branch of the process the pacing engine sends a rate (β) of invitations to customers online, for example, customers that are browsing a company Web site or attending an online chat session hosted by the company.

The number of invitations sent to customers proactively is based on a goal of generating a sufficient number of customers who will engage the contact center. More than one online location can be the target of invitations for a same campaign. Those proactive invites can be added to a general list of customers whose contact information is known to the contact center. It is noted that some invitations may be rejected or ignored and not all customers who engage the center may require the assistance of an agent.

The system determines at step 503 if there is a sufficient acceptance rate for the invitations, meaning that there should be evidence of customer acceptance sufficient to justify an outbound campaign using assistance provided by agents. If at step 503 there is not sufficient acceptance rate of the invitations sent, the process may loop back to step 501 to send more invitations until sufficient acceptance is generated for an outbound dialing campaign.

The pacing engine also sends predicted rate (a) of invitations to agents at step 502 in parallel with the process branch beginning at step 501. The algorithm takes into account the number of customers targeted in the outbound campaign. In one embodiment step 502 is delayed until a clear list of outbound targets is generated. At step 504 the system determines if there is a sufficient acceptance rate of invitations to move forward with the campaign. If there is not a sufficient rate of acceptance determined at step 503 then the process branch may loop back to step 502 and more invitations may be generated and sent to agents. It is noted herein that some agents may reject or ignore invitations. The number of invitations generated and sent to agents should be sufficient to generate a sufficient number of available agents to handle the pending transactions.

At step 503 if there is sufficient acceptance generated, then at step 505 the automatic dialing system contacts customers by placing outbound telephone calls to the contact numbers provided by customers or those already known to the system. It is noted herein that an additional pacing engine may be provided to limit the frequency of outbound calls to a number at or just below the number of available agents. The dialer may dial customers from a list at a frequency governed by a pacing algorithm. Those customers that answer the dialer are greeted by IVR and the IVR interacts with each customer to determine if the transaction will require services of an agent at step 507.

In the meantime agents that have accepted an invitation are represented in a queue at step 506. At step 507 the IVR may determine that there are calls that do not require the services of an agent. For these calls the IVR may complete the transactions at step 512 without using live personnel. The IVR may transfer calls requiring the services of an agent to an event queue at step 509. The queue contains the identities and routing information for all of the agents having accepted an invitation to engage a customer. The queue may be visible to the IVR system and/or to dedicated agents. However, in this process dedicated agents are not involved in handling transactions. In another embodiment additional steps may be added to accommodate routing to live dedicated agents.

At step 508 the system determines if any time outs have occurred in the queue relative to transaction-ready agents. If any agents have timed out, meaning that they have waited past a specified TTL for a time window beginning at acceptance of their invitation and ending at a point after which they should be engaged with the customer. If the specified TTL expires for any agents at step 508 then those agents are considered unavailable for a period of time at step 511. The process in that branch loops back to step 502 and the timed-out agents are considered prospects that can receive a next invitation. It is noted herein that the number of connected customers requiring assistance from an agent should be sufficient to engage all of the available agents who have accepted an invitation.

Assuming no timeouts at step 508, or more particularly those agents who have not timed out are engaged with customers at step 510. Transactions are completed by agents at step 513. In one embodiment all calls between agents and customers are monitored and mined for statistics such as average call handling time. In this process the number of invitations sent to customers is paced as is the frequency of outbound call placement. The number of invitations sent to agents is also paced. Pacing invitations and outbound call placement is performed to better control the environment of interaction and works to keep EWT in queue down and reduces or prevents timeouts from occurring.

There are many variables with respect to predicting numbers of invitations for customers and agents. For example, if there are 50 prospective customers detected online and only 10 agents working with or available to the system, and the ratio of acceptance of an invitation is 50% for customers and 50% for special agents then 50 invitations could be sent out to get 25 customers to agree to accept an outbound call. Out of 25 customers called 5 may not be available to connect leaving 20 customers likely to be queued for an agent assuming all of the transactions require services that may be provided by the agents. Out of the 10 agents solicited only 5 agree to accept engagement with a customer following a 50% rejection rate. This leaves 4 customers per agent.

The pacing algorithm for dialing the outbound contact numbers would take into account 5 agents available (accepted invitation) so the system may dial only 7 of the 20 customers who agreed to accept an outbound call. Perhaps one or two of the customers cannot be connected to the system. In that case 5 customers can be distributed to 5 agents. The dialer may place another batch of calls after a number of agents have completed their transactions and new invitations sent to all of the agents again to secure a number of available agents to handle the next batch dialed.

In this example an agent may be invited to engage one transaction. After that transaction is complete the agent is no longer considered available again until a next invitation is accepted and the agent is again queued considered ready to engage. However in another embodiment, an invitation may be good for two or three calls depending on the circumstances. In still another embodiment an invitation may be for a dedicated time period such as to engage customers for one hour. Invited agents cannot be as tightly controlled as dedicated agents because of their other high priority duties and a fact that many may work outside the contact center. It is this consideration that lends to inviting agents to engage customers rather than scheduling them to work telephones as part of their duties. The algorithms have to work in sync with variables on both sides in order to successfully predict the numbers of invitations that should be sent to customers and to agents.

Figure 6:
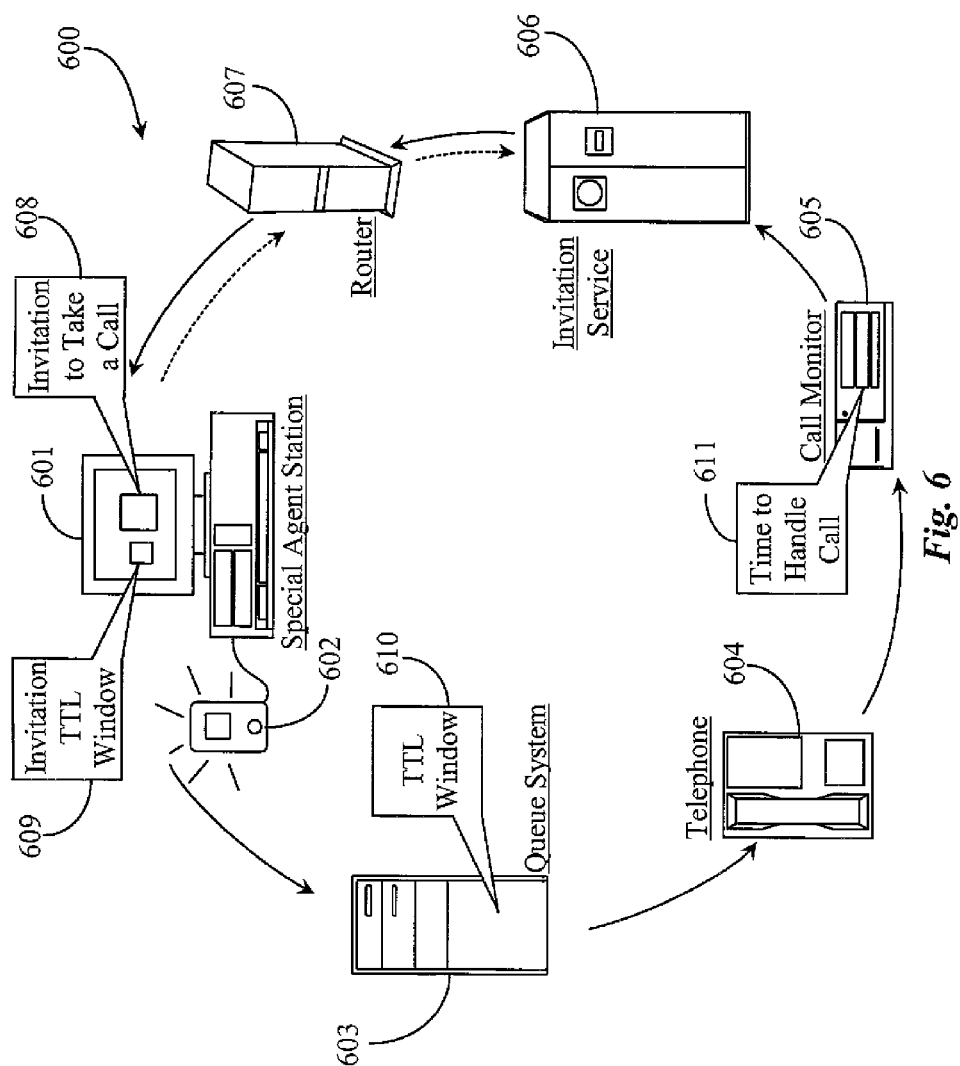
FIG. 6 is a block diagram illustrating system architecture for inviting certain agents to participate in transaction handling and taking statistics on transactions handled in an embodiment of the present invention.

FIG. 6 is a block diagram illustrating a system architecture 600 for inviting agents to participate in transaction handling and taking statistics on transactions handled in an embodiment of the present invention. System architecture 600 includes the basic system nodes and communications devices used to enable invitations to be generated and sent to an agent and to enable monitoring of the agent interacting with customers. A pacing server 606 is illustrated in this example and may be analogous to pacing server 116 running invite application 132 of FIG. 1. Server 606 provides the invitation service to participating agents in this example and may be assumed to include invite application 132 and pacing engine 207 described further above in the description relative to FIG. 2 of this specification.

A router 607 is illustrated in this example and is enabled to route invitations generated and sent by server 606. Router 607 may be an IP router capable of bridging separate LANs using the Internet. A workstation 601 operated by an agent is illustrated in this example and may be analogous to one of workstations 121*a-z* described in facility 103 of FIG. 1. Workstation 601 has a speaker system represented herein by a workstation-connected speaker 602.

In this embodiment the invitation service, including the mechanisms for pacing (pacing engine) and alert or message generation, sends an invitation to engage a transaction (customer call) to the agent operating at workstation 601. The invitation 608 is routed to workstation 601 over the network by router 607. An invitation 608 appears on the VDU of workstation 601 as an interactive alert or message that can be a toast, a pop-up, or some other interactive visual that appears on screen. In one embodiment the invitation 608 includes an audio alert that plays over speaker 602. Propagation of the invitation is illustrated by solid directional arrows between the server, router, and workstation.

Invitation 608 solicits the agent to take a single interaction and the agent may interact with the message to accept or reject the invitation. If the agent rejects the invitation when it appears, a reply message specifying the rejection of the invitation is routed back to the original server 606 (illustrated by broken directional arrows). An agent that rejects or ignores invitation 608 is considered not available to the system for a period before the agent becomes a prospect for a next invitation. In one embodiment invitation 608 may solicit the agent to engage in more than one transaction or to engage in transactions for a determined and dedicated period of time.

Invitation 608 has a TTL, which is visually represented herein as a TTL window 609 displayed in the VDU of workstation 601. TTL window 609 ticks down in time from the point of receipt and display of invitation 608. An example of a TTL period may be a 60 second time window for accepting the invitation. If the agent operating station 601 does not accept invitation 608 within 60 seconds, the invitation expires and cannot then be accepted. Invitation 608 can be manually rejected within the 60 second time window. 60 seconds is an arbitrarily chosen time period for the purpose of discussion only. An actual TTL may be less then or greater than 60 seconds without departing from the spirit and scope of the present invention.

If the agent operating workstation 601 accepts invitation 608 within TTL time window 609 then that agent is represented in a queue listing all of available agents that have accepted invitations and are ready to take a transaction. The queue is held in a queuing system 603. In one embodiment of the present invention a second TTL is imposed on the system beginning the moment an agent accepts an invitation. This TTL is visually represented in this example as a TTL window 610 applicable to an agent queued on system 603. It is noted herein that queuing system 603 has a digital medium accessible thereto for supporting the virtual queue of agents and the queue management application (not illustrated) required to manage the queue. Likewise, server 606 has a digital medium accessible thereto for storing data for generating invitations and for supporting the pacing engine that predicts the appropriate numbers of invitations to send out.

Once an agent enters queue the TTL is ticking down. An example of such a TTL window may be a 120 second window within which the agent must take a call from a customer. If the agent does not engage a customer within the TTL period the queue representation of the agent expires and the results are similar to rejection of an invitation. The agent may be considered not available to the system for a period followed by a new consideration of the agent as a prospect for a next invitation. In a preferred embodiment a correct ration of agents to incoming transactions is maintained through pacing the invitations so that there is always an available agent ready to take a call within the imposed TTL on the agent in queue. TTL 610 is imposed for the purpose of reducing idle time of the agent. An agent that waits too long in queue after accepting an invitation to engage a customer may become prone to ignoring or rejecting future invitations.

In this example an agent telephone 604 is illustrated as the communications device that the agent will use to interact with a customer. Other communications devices may substitute for telephone 604 without departing from the spirit and scope of the present invention. Telephone 604 registers a ringing event hopefully within TTL 610. The agent simply answers the telephone to engage the customer and finishes the transaction.

A call monitor 605 is provided in this example having a digital medium accessible thereto for storing call monitoring SW and statistics mining SW. Call monitor 605 monitors all of the agent/customer calls resulting from accepted invitations. One statistic mined from interaction is average time 611 to handle the call by the agent measured from beginning to end of the call. This statistic may weigh on pacing invitations to be sent.

In one embodiment agents may be enabled to configure how they will receive invitations to engage customers and to what computing devices those invitations will be propagated. This may be accomplished through an online interface and application made accessible to agents on a network or through a special desktop application distributed to participating agent workstations analogous to application 134 running on workstation 121z in facility 103 of FIG. 1.

Figure 7:
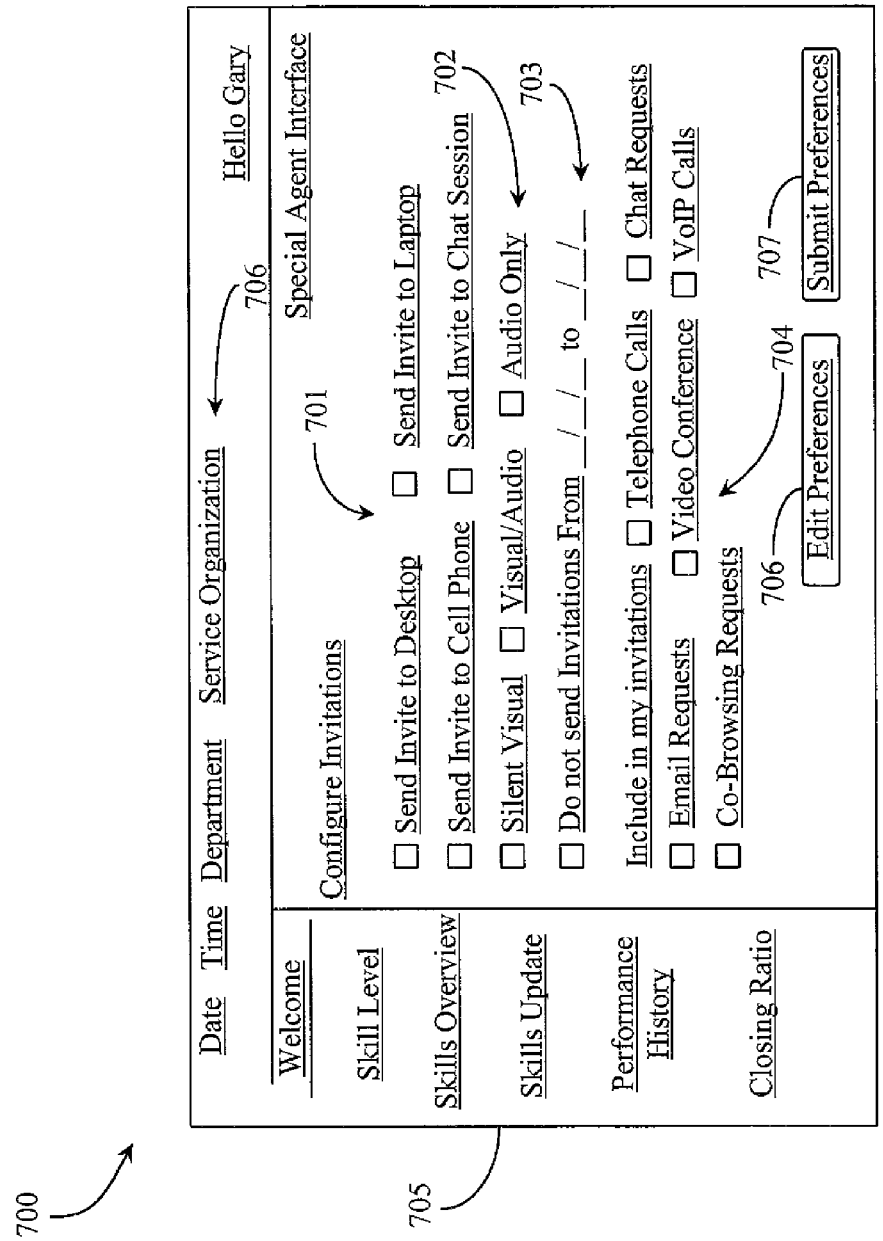
FIG. 7 is a screen shot of a configuration interface for an agent to configure and submit invitation preferences in an embodiment of the invention.

FIG. 7 is an exemplary screen shot of a configuration interface 700 for an agent to submit invitation preferences to an invitation service in an embodiment of the invention. Interface 700 may be accessible online at a specified online location made known to a pool of agents. In one embodiment interface 700 is part of a desktop application that may be similar to a dedicated agent desktop application. Interface 700 is a configuration interface adapted to enable an agent to pre-configure how he or she wants to receive invitations and where the invitations may be propagated.

Interface 700 may be a personalized interface that includes identification data 706 relevant to date and time, the department identification of the agent, and the service organization that hosts the department. A greeting "hello Gary" is an example of personalization of the interface. In the configuration interface options 701 are provided with check boxes for the agent to mark. Options 701 include selectable options for sending the invite to Desktop, Laptop, Cell phone, and Chat session. One or all of these options may be selected. For example if Desktop and cell phone are selected the invitation will be propagated to both devices.

Display options 702 are provided for selecting the presentation parameters of invitations. Silent Visual may be selected, Visual Audio may be selected, and audio only may be selected. An option 703 enables the agent to turn off invitations for a specific period of time, which can range from a time period in a workday to a period incorporating one or more days or weeks.

Options 704 cover what types of media the agent wishes to use to engage customers. Options 704 include voice calls, chat requests, email requests, video conference requests, VoIP calls, and network co-browsing requests. An interactive button 706 is provided for editing preferences already established. An interactive button 707 is provided for submitting preferences to the invitation server analogous to pacing server 116 of FIG. 1.

In one embodiment of the invention a sidebar 705 is included in interface 700. Sidebar 705 may provide information relevant to the agent that owns the interface. There are several categories under a welcome greeting including Skill level, Skills overview, Skills update, Performance History, and Closing Ratio. The overall rating information for the skills of the agent may be listed under the heading Skill Level. More detailed information about the skills of the agent may be available under the heading Skills Overview. Updates to existing skills or brand new skills attained might be listed under the heading Skills Update. Details about performance history relative to the use of the listed skills might be available under the heading Performance History. If the agent is working in sales the closing ratio might be provided under the heading of Closing Ratio.

In the above embodiment, the detailed information provided about skills of the agent and performance history might be used in developing a pool of agents that may be of service in particular campaigns where common skills are desired among the agents. Sending invitations to agents with certain skill sets might be practiced so that the appropriate skills needed to complete customer transactions might be aggregated and made available.

The present invention may be practiced in a federated environment wherein multiple local call centers are linked together as a federated call center. In this embodiment a central router with statistics compilation and reporting capability might be provided to help broker invitations to agents counted among the several local call centers.

Figure 8:
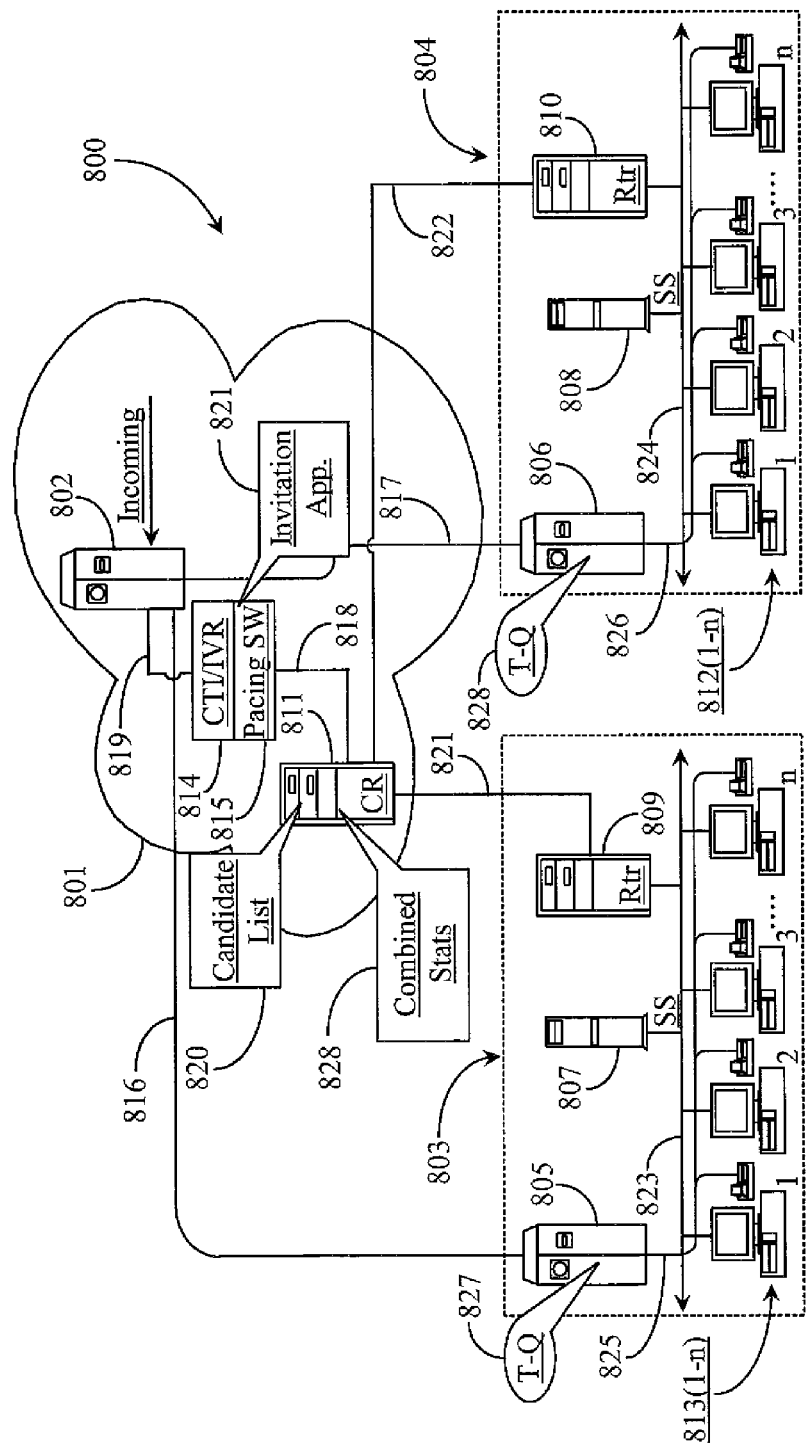
FIG. 8 is an architectural overview of a federated call center supporting agent invitation to participate in interaction according to an embodiment of the present invention.

FIG. 8 is an architectural overview of a federated call center 800 supporting agent invitation to participate in interaction according to an embodiment of the present invention. Federated call center 800 has a customer access switch 802 maintained at network level in a telecom network illustrated herein by a network cloud 801. Network 801 is logically depicted and shall represent any combination of carrier networks and the Internet network. One with skill in the art will appreciate that the physical boundaries of these disparate networks are blurred.

All potential incoming calls destined for the federated call center are represented by an arrow illustrated within network cloud 801 and labeled incoming. The rate of incoming may be represented as a Poisson process as further described above. Federated call center 800 includes a local call center 803 and a local call center 804. There may be additional local centers connected to federated center 800. However, the inventor illustrates just two local call centers for the purpose of discussion and deems the number illustrated sufficient for explanation of the invention as it applies to a federated call center. Call centers 803 and 804 are virtually identical in illustration but may be very different call centers featuring different equipment groupings, agent skills, communication capabilities and the like. Call centers 803 and 804 are physically separated from one another and may be geographically remote from one another in one embodiment.

Call center 803 houses call center agents operating from agent stations 813 (1-n). Each agent station 813 (1-n) is represented herein by a computer and a telephone. The computers are supported by a local area network 823 and the telephones are supported by internal telephone wiring 825 originating from a telephone switch 805 illustrated within the center. Telephone switch 805 may be an automated call distributor (ACD) a private branch exchange (PBX), or some other hard or soft telephone switching element.

LAN 823 supports a statistics server (SS) 807 that is adapted to compile and report statistics about the agents operating at stations 813 (1-n). Statistics may include but are not limited to agent availability, average time handling calls, skill level reporting, task performance statistics, and other statistics that might be relevant to routing. SS 807 may also compile and report statistics relative to telephone switch 805. Switch 805 includes at least one transaction queue (T-Q) 827 where calls waiting for live agents may be queued. Statistics such as estimated waiting time (EWT) in queue, abandoned call rate, and other relevant statistics might be compiled by SS 807.

Switch 802 represents a customer access point in the network. Switch 802 is connected by a telephone trunk 816 to switch 805 in call center 803. LAN 809 supports a router (Rtr) 809. Router 809 has a connection by a separate data line 821 to a central router (CR) 811 nested within network cloud 801 and connected to telephone switch 802 through a computer telephone integrated (CTI) processor 814 running an interactive voice response (IVR) system. CTI/IVR 814 is connected to switch 802 at network level by a CTI link 819.

Call center 804 includes a LAN 824 that supports agent stations 812 (1-n) in the same way and configuration described for call center 803. A telephone switch 806 is illustrated within center 804 and has connection by telephone trunk 817 to switch 802 in the network. LAN 824 supports a statistics server (SS) 808 that compiles statistics about the call center operation including all of those described with respect to SS 807. LAN 824 supports a router (Rtr) 810 that has connection to CR 811 by way of a separate data line 822.

The network of routers illustrated in this example allow all of the statistics from each individual call center to be aggregated at network level as combined statistics 828. CR 811 is adapted to compile and report statistics to CTI processor 814. In this example all of the agents working at both centers are considered for agent level routing (ALR). As described further above in this specification the agents may not be dedicated telephone agents and may be charged with many other tasks relative to call center business. Therefore, the agents operating from stations 813 (1-n) and from stations 812 (1-n) are subject to invitations to engage in a transactions according to an embodiment of the present invention. In a federated system all of the agents are considered available to the federated system for routing.

Switch 806 includes at least one transaction queue (T-Q) 828 wherein transactions are queued waiting for live agents. In this embodiment the IVR running on CTI processor 814 interacts with all incoming calls at switch 802. The IVR determines the identification of each caller and the intended purpose of each call. CTI processor 814 includes an instance of pacing software (SW) 815 and an invitation application 821. The system works by considering the volume of incoming calls at switch 802 and considering a pool of agents or a candidate list (820) to determine what frequency to pace invitations sent to agents to engage in transactions.

In this embodiment invitations are sent out to candidate agents from both call centers 803 and 804. CR 811 receives statistics from SS 807 and from SS 808. The statistics are developed to produce a candidate list 820 of agents who have a probability of accepting an invitation to engage in a transaction. The invitations are sent to individual agent stations 813 (1-n) and to 812 (1-n) via the routing system of CR 811, router 809, and router 810.

In one embodiment the routing process is cascaded over all of the local call centers according to some criteria established for routing a call. For example, assume an incoming call at switch 802 in interaction with IVR (814). The IVR determines the reason for the call and that the call requires a live agent. A routing criterion may be simple like looking for an agent among a pool of agents with the longest idle time to answer the call. CR 811 receives a request to route the call and sends the request including the routing criteria desired to router 809 and to router 810. At the local level (within each call center) available agents are searched to determine those having the longest idle time. Each router then returns one or more candidates including the associated statistics to CR 811. CR 811 then determines a target agent to which the call is routed. In one embodiment candidate list 820 and combined stats 828 are part of the same data response from the local routers to CR 811 with each stat associated with each candidate for receiving the call.

In one embodiment all of the agents who were deemed available to the system and that had a probability of accepting an invitation to engage in a transaction have been invited to accept a transaction and are monitored for acceptance prior to routing. Those that have accepted the invitation but have not yet engaged a caller are considered for routing according to the criteria. In this case the agent who accepted an invitation to engage a caller with the longest time waiting for a call is selected as a target for routing the next call. The agent may be selected from candidate list 820 and may be an agent working in call center 803 or 804. If the call is to be routed to an agent working in call center 804, the call is routed to local switch 806 and queued in T-Q 828. Notification of the incoming call is sent to the agent's computer via the network of routers. In this way the agent knows about the call and purpose of the call before it is routed to the agent's telephone (ringing event).

In another embodiment of the present invention, invitations are sent out to agents after a routing request has been sent and information returned to develop candidate list 820 of available agents. Pacing SW 815 may then send invitations to all of those agents and monitor for acceptance. In this case, the first agent to accept the invitation will get the call. The invitations sent may include data about the call, caller, and purpose of the call. For example, the caller may want to purchase an item that brings commission to an agent who handles the transaction. Some of the invited agents may be less motivated than others to accept the invitation to handle the call. Therefore, the hungriest agent is likely to be the first agent to accept the invitation.

In the above-described embodiment, it may be that agents (if more than one) accepted the invitation sent ahead of routing the call but did not get that call. A reservation time may be given to those agents so that they may be reserved to be included as possible routing targets of a next call matching the criteria that initiated the invitation round. There are many possibilities. Other considerations for routing may be least cost of processing or faster call handling average. The method of the invention may be used in skills-based routing where agents of specific skill levels are the only ones invited to handle certain calls.

Call routing intelligence used to determine an agent candidate list from available agents across the federation may vary widely. For example, one call center may have costs of processing expressed in US dollar amounts while another site may express costs in Euros. CR 811 may be enabled to determine the best value for routing a call by conversion table. Local routing systems may select a number of candidates for routing based on statistics and routing criteria sent with the routing request wherein those agents advance to a next level where further screening reduces the number of eligible candidates. Ultimately, CR 811 determines the target agent from candidate list 820. The agent reservation time limit may be analogous to the TTL described further above for an agent who has accepted an invitation to interact with a caller but has not yet received a call.

The present invention may be practiced using agents that are grouped physically onto one supporting network or agents that are physically remote from one another but have connection to the Internet network where the Internet serves as the carrier network for sending invitations. It will be apparent to one with skill in the art that the transaction routing and management system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for routing interactions, comprising:
a processor;
a memory, wherein the memory has stored thereon instructions that, when executed by the processor, causes the processor to:
identify a plurality of incoming interactions from a plurality of customers;
predict a number of the incoming interactions that will await live assistance by one or more of a plurality of agents;
calculate a rate for sending invitations to the plurality of agents based on the predicted number, wherein the invitations are for soliciting the plurality of agents to handle the interactions that await live assistance, the invitations being configured to be displayed on agent devices of the plurality of agents;
pace the invitations to the plurality of agents based on the calculated rate, wherein the pacing includes increasing or decreasing a frequency of invitations to the plurality of agents based on the calculated rate; and
in response to acceptance of one of the invitations by one of the plurality of agents, cause routing of a particular interaction of the plurality of interactions that await live assistance, to the agent accepting the invitation, wherein the routing of the particular interaction establishes a communication link between one of the plurality of customers and the agent accepting the invitation.

2. The system of claim 1 wherein the rate is calculated based on statistics relating to handling of the incoming interactions by the plurality of agents.

3. The system of claim 2 wherein the statistics include average handle time of the plurality of agents.

4. The system of claim 1 wherein the predicting is based on past contact center history.

5. The system of claim 1 wherein the program instructions cause the processor to update status identifiers of the agents in response to acceptance of the invitations and engagement of the interactions by the agents.

6. The system of claim 1 wherein the program instructions cause the processor to designate invitations as rejected if the agents do not respond within a preset time period.

7. The system of claim 1 wherein the particular interaction is routed to a first available agent of the plurality of agents that has accepted one of the invitations.

8. The system of claim 1 wherein the program instructions cause the processor to receive read receipts in response to the agents opening or reading the invitations.

9. The system of claim 1 wherein the program instructions cause the processor to calculate a second rate of sending invitations to prospective customers based on a predicted number of the invited customers that will require services of one of the plurality of agents.

10. The system of claim 9 wherein the invitations are sent during an outbound campaign.

11. The system of claim 1, wherein the rate is calculated based on calculating a probability that the plurality of agents will accept the invitations.

12. The system of claim 1, wherein the calculating the rate of sending invitations comprises predicting an optimal rate of sending invitations to the agents for ensuring availability of the agents for handling of the interactions.

13. The system of claim 1, wherein the calculated rate fluctuates as the predicted number is updated.

14. A method for routing interactions, comprising:
identifying, by a processor, a plurality of incoming interactions from a plurality of customers;

predicting, by the processor, a number of the incoming interactions that will await live assistance by one or more of a plurality of agents;

calculating, by the processor, a rate for sending invitations to the plurality of agents based on the predicted number, wherein the invitations are for soliciting the plurality of agents to handle the interactions that await live assistance, the invitations being configured to be displayed on agent devices of the plurality of agents;

pacing, by the processor, the invitations to the plurality of agents based on the calculated rate, wherein the pacing includes increasing or decreasing a frequency of invitations to the plurality of agents based on the calculated rate; and in response to acceptance of one of the invitations by one of the plurality of agents, causing, by the processor, routing of a particular interaction of the plurality of interactions that await live assistance, to the agent accepting the invitation, wherein the routing of the particular interaction establishes a communication link between one of the plurality of customers and the agent accepting the invitation.

15. The method of claim 14 wherein the rate is calculated based on statistics relating to handling of the incoming interactions by the plurality of agents.

16. The method of claim 15 wherein the statistics include average handle time of the plurality of agents.

17. The method of claim 14 wherein the predicting is based on past contact center history.

18. The method of claim 14 further comprising updating, by the processor, status identifiers of the agents in response to acceptance of the invitations and engagement of the interactions by the agents.

19. The method of claim 14 further comprising designating, by the processor, invitations as rejected if the agents do not respond within a preset time period.

20. The method of claim 14 wherein the particular interaction is routed to a first available agent of the plurality of agents that has accepted one of the invitations.

21. The method of claim 14 further comprising choosing, by the one of the plurality of agents, the interaction from a plurality of interactions after acceptance of the one of the invitations by the one of the plurality of agents.

22. The method of claim 14 further comprising receiving, by the processor, read receipts in response to the agents opening or reading the invitations.

23. The method of claim 14 further comprising calculating, by the processor, a second rate of sending invitations to prospective customers based on a predicted number of the invited customers that will require services of one of the plurality of agents.

24. The method of claim 23 wherein the invitations are sent during an outbound campaign.

* * * * *